May 9, 1967 — S. V. PUIDOKAS — 3,318,173

DIFFERENTIAL GEAR ASSEMBLY

Filed March 19, 1965

INVENTOR.
STANLEY V. PUIDOKAS
BY
Carl J. Barbee
ATTORNEY

United States Patent Office 3,318,173
Patented May 9, 1967

3,318,173
DIFFERENTIAL GEAR ASSEMBLY
Stanley V. Puidokas, Kenosha, Wis., assignor to American Motors Corporation, Kenosha, Wis., a corporation of Maryland
Filed Mar. 19, 1965, Ser. No. 441,117
2 Claims. (Cl. 74—713)

ABSTRACT OF THE DISCLOSURE

A mechanism intended primarily for vehicular use having a member for positioning the drive pinion relative to the differential case ring gear and for controlling the flow of lubricant to the bearings of the pinion shaft.

The conventional non-locking differential gear assembly for a vehicle includes a case rotatably mounted in the assembly housing. The case, in turn, contains rotatably mounted differential pinions and differential side gears for engagement with the axle shafts. Fixedly secured to the exterior of the case is a ring gear. Engaging and driving the ring gear is a drive pinion. The pinion is located on one end of the pinion shaft and is generally integral therewith. The other end of the shaft extends outside the housing and by virtue of splines located thereon is adapted to be engaged and driven through a conventional universal joint. Between the pinion and the splined end of the shaft are positioned opposedly mounted roller bearings which rotatably support the pinion shaft in the housing. Shims are used in conjunction with the aforementioned roller bearings to account for manufacturing tolerances and to preload same with the aid of a pinion nut.

In operation of the assembly, the pinion drives the ring gear which also acts as a pump to circulate the assembly lubricant through a housing upper passage into the area between the roller bearings. As the bearings rotate, they draw lubricant therethrough and back to the area of the pinion gear. Primarily due to the difference in size between the bearings, the larger bearing adjacent the pinion attracts the majority of lubricant and causes the smaller bearing to run virtually dry. This condition is accentuated when the lubricant level is low and the vehicle is climbing a grade.

Applicant has modified the differential gear assembly described above to economically provide improved lubrication (as proved by tests) for both pinion shaft roller bearings. Specifically, applicant has developed a unique combination shim and baffle member. The member provides the shim function in the assembly while at the same time acting as a baffle to limit the lubricant flow to the larger bearing and to maintain in the housing an adequate lubricant supply for use with the smaller bearing.

It is, therefore, an object of this invention to provide a new and improved differential gear assembly.

Another object of this invention is to provide a differential gear assembly that maintains an adequate supply of lubricant for the pinion shaft bearings.

Another object of this invention is to provide a differential gear assembly that maintains an adequate supply of lubricant for the smaller pinion shaft bearing.

Another object of this invention is to provide a differential gear assembly that maintains an adequate supply of lubricant for the pinion shaft bearings and which can be produced at less cost.

Another object of this invention is to provide a combination shim and lubricant baffle for use with the bearings of a vehicle differential gear assembly.

Other objects and advantages will become apparent from the following description in conjunction with the attached drawing in which.

Figure 1:
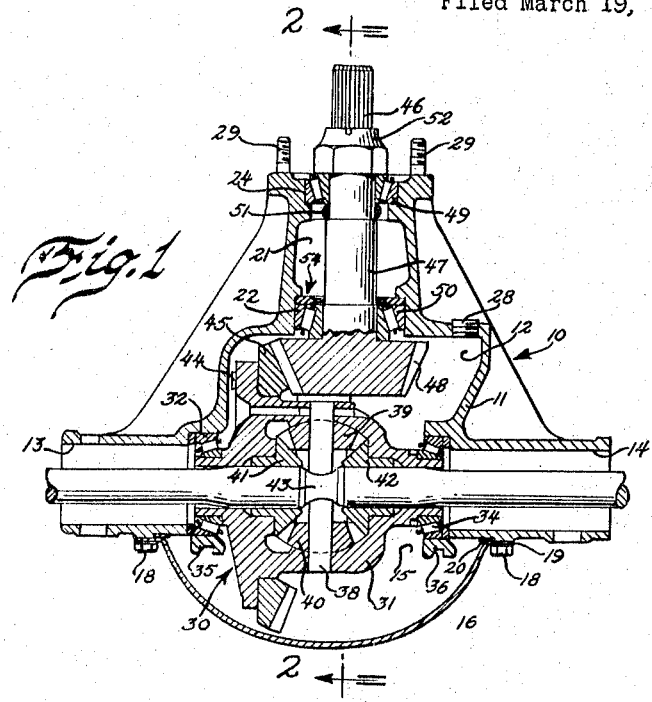
FIGURE 1 is a top section of the differential gear assembly of this invention.
Figure 2:
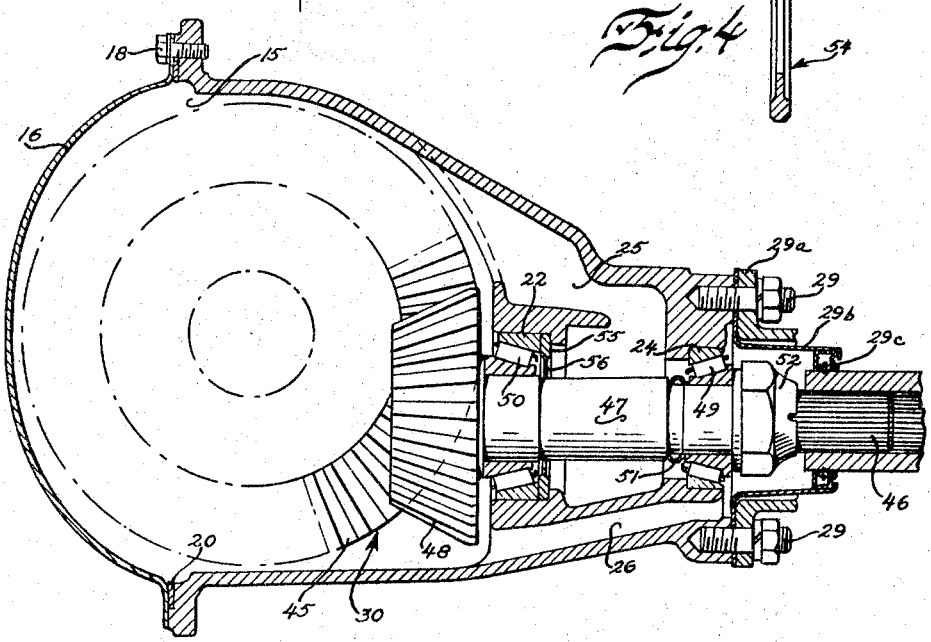
FIGURE 2 is an enlarged vertical section taken along line 2—2 of FIGURE 1 with the internal gears of the differential unit removed.

Referring to FIGURES 1 and 2, 10 indicates generally a vehicle differential gear assembly. Assembly 10 includes a differential gear assembly housing 11 having an inner chamber 12. Housing 11 has a pair of generally opposed entrances 13 and 14 for the installation therein of conventional axle tubes (not shown). Housing 11 also has a large aperture 15 for the installation therethrough of the internal moving components of the assembly. Closing the housing aperture 15 with metal-to-metal contact, is cover 16. Capscrews 18 and lockwashers 19 secure cover 16 to housing 11. Gasket 20 is compressed between housing 11 and cover 16 to seal the aperture to prevent the leakage of lubricant therethrough.

Elongated exit 21 in housing 11 connects chamber 12 with the exterior of the housing. Located in exit 21 are roller bearing seats 22 and 24. Upper passage 25 connects chamber 12 to exit 21 between seats 22 and 24. Lower conduit 26 connects chamber 12 to exit 21 outward of seat 24. Filler plug 28 is supplied for replenishing the lubricant supply without removing cover 16. Studs 29 are provided for the attachment of a torque tube 29a (only a portion of which is shown) and a seal retainer 29b having a seal 29c therein to prevent loss of lubricant out exit 21.

Located in chamber 12 of housing 11 is differential gear unit 30 of assembly 10. Unit 30 includes a differential gear case 31 which is rotatably mounted in chamber 12 by shim equipped roller bearings 32 and 34. Capscrew affixed bearing caps 35 and 36 secure bearings 32 and 34 respectively in chamber 12. Case 31 has a shaft 38 locked therein which rotatably supports differential pinion gears 39 and 40. Meshing with differential pinion gears 39 and 40 are differential side gears 41 and 42 which are adapted to drive the associated axles. Thrust block 43 spaces the differential side gears 41 and 42. Attached to the exterior of case 31 by capscrews 44 for the purpose of rotating same is ring gear 45.

Pinion shaft 47 has a pinion 48 on one end meshing with and adapted to drive ring gear 45 and a splined end 46 for engagement with a universal joint equipped drive shaft (not shown). Rotatably supporting pinion shaft 47 in exit seats 22 and 24 respectively are roller bearings 49 and 50. Because of more severe load conditions, bearing 50 is considerably larger than bearing 49. Collapsible spacer 51 and deformable pinion nut 52 staked to splines in shaft 47 secure shaft 47 in exit 21 of housing 11 with the desired preload on roller bearings 49 and 50.

Figure 3:
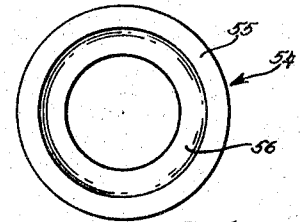
FIGURE 3 is a side view of combination shim and baffle of this invention.
Figure 4:
FIGURE 4 is a vertical section of the combination shim and baffle.

A combination shim baffle 54 is located between the cup of larger bearing 50 and the associated bearing shoulder in housing exit 21. Shim baffle 54 has an outer shim portion 55 that provides a shim function for optimum positioning of pinion 48 in relation to mating ring gear 45. Shim baffle 54 also has an inner baffle portion 56 that divides the flow of lubricant between bearings 49 and 50. Shim baffle 54 is shown in detail in FIGURES 3 and 4.

In operation, a drive or propeller shaft through a universal joint (not shown) engages the splines on the end of pinion shaft 47 and rotates the pinion shaft. The pinion 48 meshing with ring gear 45, therefore, causes same to rotate. Case 31 attached to ring gear 45 rotates also causing the differential pinion gears 39 and 40 located in case 31 to drive the meshing differential side gears 41 and 42 which are adapted to drive the vehicle axles. The rotating ring gear 45 also performs a second function of pumping the lubricant from the chamber 12 through the upper passage 25 into the exit 21 between bearings 49 and 50. Primarily because of its larger size, pinion shaft roller bearing 50 during shaft rotation normally attracts lubricant from smaller bearing 49. Baffle portion 56 which is preferably recessed on one side to provide clearance for the cone and associated cage of bearing 50 also forms a generally close radial clearance with shaft 47 which clearance is adapted to regulate the flow of lubricant to and through bearing 50 back to chamber 12. Baffle portion 56 also performs the function of a dam in conjunction with housing 11 for maintaining a reservoir of lubricant therebehind for smaller bearing 49 in exit 21 outward of bearing 50. As the lubricant is utilized by bearing 49, the lubricant subsequently flows through conduit 26 back into chamber 12 for further use in the assembly. Because of baffle portion 56 of shim baffle 54, an adequate reservoir of lubricant is available at all times for bearing 49 even when the vehicle is climbing a grade and the assembly lubricant level is low.

Although only one shim baffle 54 is shown in the assembly, it is readily apparent a plurality of same could be used if needed. Also for interchangeability at assembly, the baffle portion 56 preferably is recessed symmetrically on both sides from the shim portion 55 of shim baffle 54.

From the above, it is clearly apparent that applicant has devised an economical and improved differential gear assembly and a unique combination shim baffle for use therewith.

Having thus described the invention, it will be apparent to those skilled in the art that various modifications and changes can be made without departing from the spirit of the invention and the scope of the subjoined claims.

I claim:
1. A differential gear assembly comprising:
 (a) a housing defining a chamber having an elongated exit, said housing having a passage above said exit and connecting said chamber and exit and a conduit below said exit and extending from said chamber and joining said exit outward of said passage;
 (b) a case rotatably mounted in said housing chamber, said case having an interior adapted to contain differential gears for actuating drive axles;
 (c) a ring gear attached to the exterior of said case;
 (d) a pinion shaft having a pinion engaging said ring gear for driving same, said shaft also extending through said exit and being adapted to be connected to a source of power;
 (e) a pair of spaced opposedly mounted cup and cone type roller bearings rotatably supporting said pinion shaft in said housing exit, one of said bearings being larger than the other bearing, said larger bearing being adjacent said pinion, said smaller bearing being located in said exit inward of said conduit joining therewith;
 (f) a combination shim baffle mounted in said housing between said pair of bearings, said shim baffle having a shim portion contacting the cup of said larger bearing for optimum positioning of said pinion relative to said ring gear, said shim baffle also having an annular baffle portion surrounding said shaft and forming a generally close radial clearance therewith, said baffle portion having a side recessed away from said larger bearing to provide axial clearance with the cone portion of said larger bearing, said baffle portion restricting the flow of lubricant through said clearance to said larger bearing and maintaining a reservoir in said exit of lubricant pumped therein by said ring gear through said passage during assembly operation, said reservoir providing lubricant for said smaller bearing, said lubricant from said reservoir returning through said conduit to said chamber after lubricating said smaller bearing;
 (g) means for securing said shaft in said bearings.
2. The differential assembly of claim 1 in which said shim baffle portion also has a side recessed toward said larger bearing to form a symmetric shim baffle.

References Cited by the Examiner

UNITED STATES PATENTS

| | | | |
|---|---|---|---|
| 1,614,992 | 1/1927 | Roberts | 74—607 X |
| 2,034,227 | 3/1936 | Colwell et al. | 308—36.1 |
| 2,077,881 | 4/1937 | Gits | 308—187.1 X |
| 2,507,804 | 5/1950 | Minnis | 308—187.1 |
| 2,701,972 | 2/1955 | Hoffman | 74—607 |
| 2,895,315 | 7/1959 | Fishtahler. | |
| 2,989,327 | 6/1961 | Hermanus. | |
| 3,073,657 | 1/1963 | Oxford | 308—187.1 |
| 3,244,457 | 4/1966 | Ross | 74—257 X |

FOREIGN PATENTS 585,645  11/1958  Italy.

DAVID J. WILLIAMOWSKY, *Primary Examiner.*

J. A. WONG, *Assistant Examiner.*